United States Patent [19]

Piziks

[11] 3,732,747

[45] May 15, 1973

[54] GEARSHIFT ARRANGEMENT

[75] Inventor: Henry I. Piziks, Saginaw, Mich.

[73] Assignee: General Motors Corporation, Detroit, Mich.

[22] Filed: Jan. 28, 1972

[21] Appl. No.: 221,642

[52] U.S. Cl. ............................. 74/487, 74/473 SW
[51] Int. Cl. ............................................. G05g 7/02
[58] Field of Search ................... 74/487, 486, 485, 74/484, 473 SW

[56] References Cited

UNITED STATES PATENTS 3,088,449    5/1963    Hockaday et al. ................... 74/487 X

*Primary Examiner*—Milton Kaufman
*Attorney*—Warren E. Finken et al.

[57] ABSTRACT

The drawings illustrate a gearshift mechanism including a gearshift lever bowl assembly mounted above the upper column housing and encompassing a steering column-mounted gearing arrangement which is responsive to rotary movement of a manually actuated selector lever to axially actuate a cable extending to a transmission shift lever.

4 Claims, 5 Drawing Figures

PATENTED MAY 15 1973

3,732,747

GEARSHIFT ARRANGEMENT

This invention relates to transmission gearshift mechanisms and, more particularly, to a steering column-mounted gearing arrangement for actuating a gear ratio selector cable.

While prior steering column-mounted gearshift controls have generally included a shift tube extending along the steering column, and a cooperating pivotable lower linkage arrangement, this invention, embodying a gearing and cable shift selector arrangement, provides for a plurality of advantages; for example, both the shift tube and the pivotable lower linkage may be eliminated; a standard length for the steering column jacket may be selected for all vehicular models; the gearshift lever may be located closer to the steering wheel and farther away from the dashboard; and the gearshift lever bowl assembly may be relatively small.

Accordingly, an object of the invention is to provide an improved steering column-mounted gearshift mechanism which provides the above advantages in a compact and efficient arrangement.

Another object of the invention is to provide an improved steering column-mounted gearshift mechanism which employs a gearshift lever bowl assembly which is located above the upper column housing, adjacent the usual signal switch assembly and steering wheel.

A further object of the invention is to provide an improved steering column-mounted gearshift mechanism, which includes a gearing arrangement in the gearshift lever bowl and upper column housing, actuatable by the gearshift lever to reciprocably move a cable extending from the gearing arrangement downwardly through the steering column outer housing directly to a transmission shift lever, without the need for pivotable lower linkage members, for selecting desired drive ratios.

Still another object of the invention is to provide a steering column-mounted gearing and cable arrangement which permits the gearshift lever bowl assembly to be mounted above the upper column housing, thereby providing for a smaller dashboard opening and thus enhancing the appearance thereof, while permitting the adoption of a standard length for both the cable and the steering column jacket.

A still further object of the invention is to provide a column-mounted gearing arrangement responsive to rotary movement of a steering column-mounted manually actuated gearshift lever for translating such rotary movement into axial movement for selective axial actuation of a cable controlling a transmission shift lever.

Another object of the invention is to provide an improved gearshift arrangement wherein rotation of the gearshift bowl rotates an arcuate-shaped gear segment formed integrally therewith to, in turn, rotate a bevel gear formed integrally with a pinion gear and rotatably mounted on the upper column housing. Rotation of the pinion gear actuates an axially movable gear rack to which a transmission shift lever cable is connected for selection of the desired drive ratios.

These and other objects and advantages of the invention will be apparent when reference is made to the following description and accompanying drawings, wherein.

Figure 1:
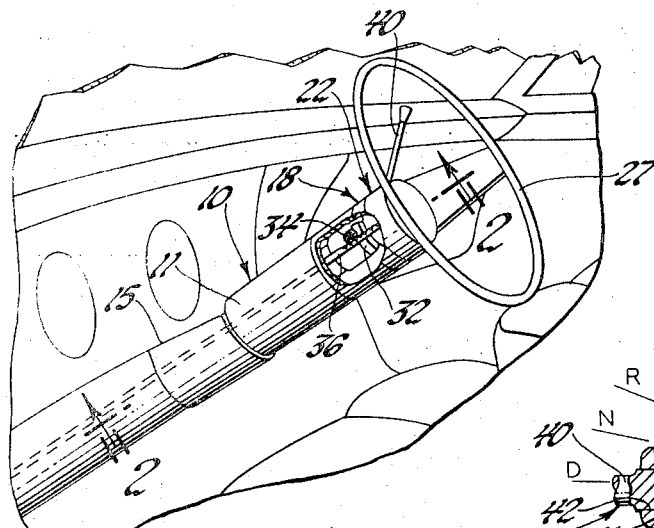
FIG. 1 is a perspective view of a vehicular steering column embodying the invention.
Figure 2:
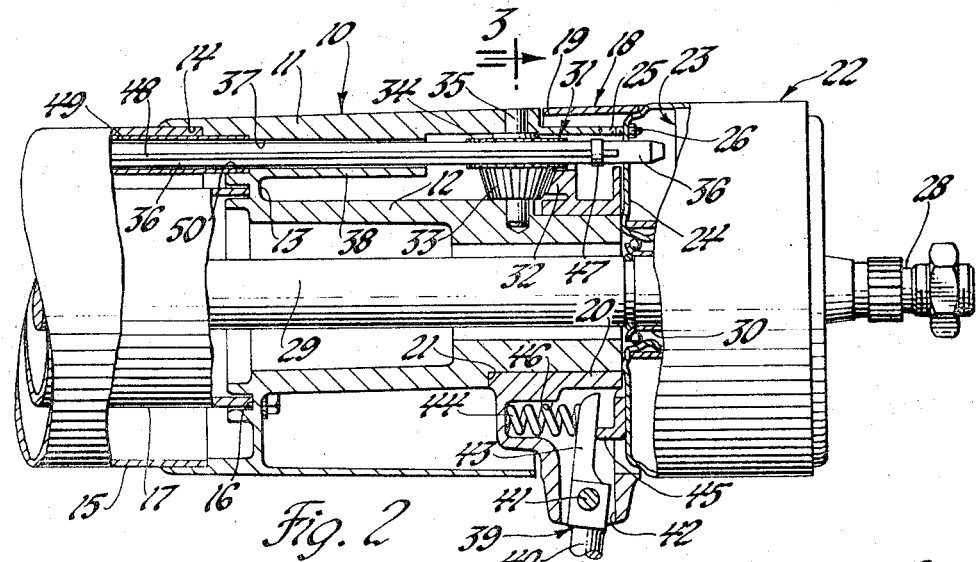
FIG. 2 is a fragmentary cross-sectional view taken along the plane of line 2—2 of FIG. 1, and looking in the direction of the arrows.

Referring now to the drawings in greater detail, FIGS. 1 and 2 illustrate a fixed upper column housing 10 including concentric outer and inner wall portions 11 and 12, respectively, interconnected by an annular end wall portion 13. A counterbore 14 is formed on the lower end of the outer wall portion 11 adjacent the end wall portion 13 for mounting on the upper end of the usual steering column outer housing 15. An annular groove 16 is formed in the end wall portion 13 for mounting on the upper end of a steering column jacket 17, the latter being located concentrically within the steering column outer housing 15.

A gearshift bowl assembly 18, including outer and inner concentric wall portions 19 and 20, respectively, is rotatably mounted on the upper end of the housing 10. Specifically, the inner wall 20 is suitably lubricated and seated on a ledge or shoulder 21 formed on the outer surface of the inner wall portion or hub 12 of the housing 10 and extending approximately three-fourths of the distance therearound.

A cover assembly 22, housing the usual signal switch assembly, represented generally at 23 (FIG. 2), is mounted on the upper edge of the outer wall portion 19 of the gearshift bowl assembly 18. An end wall portion 24 of the cover assembly 22 extends beyond the upper edge of the outer wall portion 19 of the gearshift bowl assembly 18 to a location therein adjacent the upper edge of the inner walls 12 and 20. A plurality of threaded legs or projections 25 (FIG. 2) are formed on the upper edge of the outer housing wall 11 and extend axially intermediate the outer and inner wall portions 19 and 20, respectively, to be secured in any suitable manner, such as by nuts 26, to the end wall portion 24 of the cover assembly 22 to retain the latter in a fixed position throughout all rotary movements of the bowl assembly 18. A conventional steering wheel 27 (FIG. 1) is rotatably mounted above the cover assembly 22 on the knurled and threaded end 28 (FIG. 2) of a steering shaft 29 extending through a bearing 30 and along the axis of the cover assembly 22, gearshift bowl assembly 18, the housings 10 and 15, and the jacket 17.

A gear arrangement 31 includes an arcuate-shaped gear segment 32 formed around the inner wall portion 20 of the gearshift bowl assembly 18, a bevel gear 33, and a pinion gear 34 formed integrally on a mounting pin 35, and a gear rack 36. The gear rack 36 is preferably formed of a round rod with teeth cut on one side thereof. The mounting pin 35 is mounted at its respective ends in radially aligned openings formed in the outer and inner wall portions 11 and 12 of the upper column housing 10 such that the bevel gear 33 is in mesh with the arcuate-shaped gear segment 32 (FIGS. 3 and 5), and the pinion gear 34 is in mesh with the gear rack 36 (FIG. 4). The gear rack 36, being round, is readily slidable through an opening 37 (FIG. 2) formed in the end wall portion 13, and thence through a cylindrical boss 38 (FIGS. 2 and 4) formed on the inner surface of the housing wall 11, the cylindrical boss 38 providing the support required to retain the gear rack 36 and the pinion gear 34 in mesh.

Figure 3:
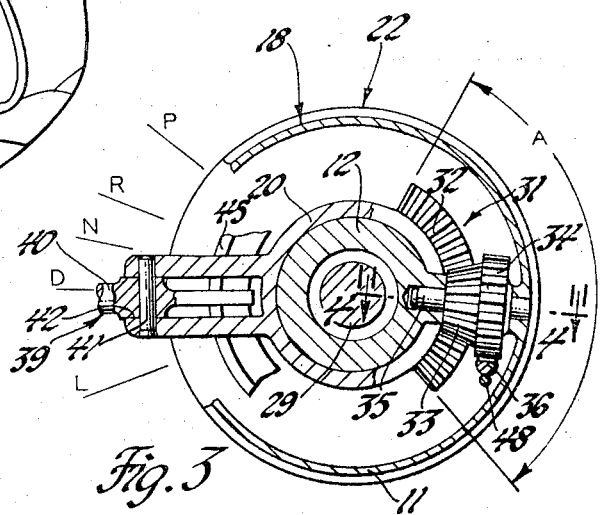
FIG. 3 is a cross-sectional view taken along the plane of line 3—3 of FIG. 2, and looking in the direction of the arrows.
Figures 4, 5:
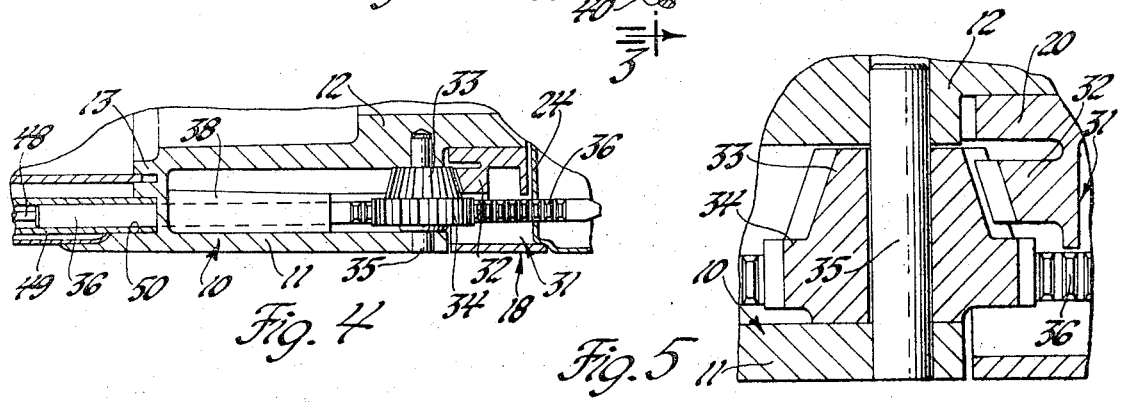
FIG. 4 is a fragmentary cross-sectional view taken along the plane of line 4—4 of FIG. 3, and looking in the direction of the arrows.
FIG. 5 is an enlarged cross-sectional view of a portion of the FIG. 4 structure.

The length of the arc of the gear segment 32, represented by "A" in FIG. 3, is approximately 60° and is located on the side of the inner wall 20 opposite a gearshift lever assembly 39 mounted on the inner wall 20 of the gearshift bowl assembly 18, as illustrated in FIG. 3. Looking down the steering column from the operator's seat (FIG. 1), the arc "A" of the gear segment 32 would be located within the 7–10 o'clock range.

The gearshift lever assembly 39 includes a gearshift lever 40 pivotally mounted on a pin 41 in an opening 42 formed in the outer wall 19 of the gearshift bowl assembly 18. A contoured inner end 43 (FIG. 2) of the lever 40 is urged by a spring 44 into contact with selected rotary shift positions "P", "R", "N", "D", and "L" (FIG. 3) formed on a gate plate 45 (FIG. 2) secured to the end wall 24 of the fixed cover assembly 22. The spring 44 is mounted in a pocket 46 formed in the bowl assembly 18.

The gear rack 36 is connected in any suitable manner, such as by a clamp 47 (FIG. 2), to a cable 48 mounted through a sheath 49 which runs along the side of the steering column jacket 17 within the steering column outer housing 15. The lower end of the round gear rack 36 is slidably mounted in the upper end portion of the sheath 49, the latter being press-fitted into an opening 50 formed adjacent the housing wall 13, or otherwise secured, such as by a clamp (not shown) to the steering column jacket 17. The gear rack 36 has a total axial movement of approximately two inches, while the bevel gear 33 is rotated about two-thirds of a revolution in response to full-length 60° movement of the gear segment 32 therepast.

OPERATION

When the gearshift bowl assembly 18 is rotated on the inner wall 12 of the upper column housing 10 in response to manual movement of the gearshift lever 40 to one of the "P", "R", "N", "D", and "L" positions (FIG. 3), the integral gear segment 32 is rotated about the center of the gearshift bowl assembly 18, causing a corresponding rotation of the fixed-axis bevel gear 33 and the integral pinion gear 34. Such rotation of the pinion gear 34 causes a corresponding up or down movement of the gear rack 36 parallel to the axis of the steering shaft 29. The axial movement of the gear rack 36 pulls or pushes the cable 48 within the sheath 49. Since the cable 48 is connected at its lower end to the shift lever on the transmission, the shift lever is moved to a position corresponding to the selected ratio positions "P", "R", "N", "D", and "L", thus selectively shifting the transmission in the conventional manner.

It should be apparent that the invention provides an improved shift selector mechanism wherein rotary movement of a selector lever is translated via a gearing arrangement into a corresponding axial movement of a cable for selectively positioning a transmission shift lever.

It should be further apparent that the invention provides for the elimination of previously required motion-transfer components, while relocating the shift lever bowl assembly as a more compact unit closer to the steering wheel.

While but one embodiment of the invention has been shown and described, other modifications thereof are possible.

I claim:

1. For use with a transmission shift lever, a column-mounted selector arrangement comprising a steering column housing, an upper housing secured to the top of said steering column housing, a gearshift bowl assembly rotatably mounted on the upper portion of said upper housing, a selector lever assembly pivotally mounted on said gearshift bowl assembly for manually rotating said gearshift bowl assembly to selected gear ratio positions, a signal switch assembly mounted adjacent the respective upper ends of said upper housing and said gearshift bowl assembly, a cable adapted to extend from said transmission shift lever through said steering column and upper housings, and gearing means operatively connected to said gearshift bowl assembly, said upper housing and said cable for axially moving said cable in response to rotary movement of said gearshift bowl assembly by said selector lever to selectively move said transmission shift lever to the desired gear ratio position.

2. For use with a transmission shift lever, a column-mounted selector arrangement comprising a steering column housing, an upper housing secured to the top of said steering column housing and having concentric outer and inner wall portions, a gearshift bowl assembly having concentric outer and inner wall portions, said latter inner wall portion being rotatably mounted on the upper portion of said inner wall portion of said upper housing, a selector lever assembly pivotally mounted on said gearshift bowl assembly for manually rotating said gearshift bowl assembly to selected gear ratio positions, a cover assembly mounted adjacent the respective upper ends of said inner wall portions of said upper housing and said gearshift bowl assembly, a cable adapted to extend from said transmission shift lever through said steering column and upper housings, and gearing means operatively connected between said respective outer and inner wall portions of said gearshift bowl assembly and said upper housing and to said cable for axially moving said cable in response to rotary movement of said gearshift bowl assembly by said selector lever to selectively move said transmission shift lever to the desired gear ratio position.

3. For use with a transmission shift lever, a column-mounted selector arrangement comprising a steering column housing, an upper housing secured to the top of said steering column housing, a gearshift bowl assembly rotatably mounted on the upper portion of said upper housing, a selector lever assembly pivotally mounted on said gearshift bowl assembly for manually rotating said gearshift bowl assembly to selected gear ratio positions, a cover assembly mounted adjacent the respective upper ends of said upper housing and said gearshift bowl assembly, a cable adapted to extend from said transmission shift lever through said steering column and upper housings, an arcuate-shaped gear segment formed on an inner periphery of said gearshift bowl assembly, a bevel gear rotatably mounted in said upper housing for meshing with said arcuate-shaped gear segment, a pinion gear formed adjacent said bevel gear for rotation therewith, and a gear rack mounted for axial movement through said upper housing, said cable being connected at the upper end thereof to said gear rack for axially moving said cable in response to rotary movement of said gearshift bowl assembly by said selector lever to selectively move said transmission shift lever to the desired gear ratio position.

4. For use with a transmission shift lever, a column-mounted selector arrangement comprising a steering column housing, an upper housing secured to the top of said steering column housing and having concentric outer and inner wall portions and an interconnecting lower end wall section, a gearshift bowl assembly having concentric outer and inner wall portions, said latter inner wall portion being rotatably mounted on the upper portion of said inner wall portion of said upper housing, a selector lever assembly pivotally mounted on said gearshift bowl assembly for manually rotating said gearshift bowl assembly to selected gear ratio positions, a cover assembly mounted adjacent the respective upper ends of said inner wall portions of said upper housing and said gearshift bowl assembly, a cable adapted to extend from said transmission shift lever through said steering column and upper housings, an arcuate-shaped gear segment formed on an outer periphery of said inner wall portion of said gearshift bowl assembly, a bevel gear rotatably mounted intermediate said outer and inner wall portions of said upper housing for meshing with said arcuate-shaped gear segment, a pinion gear formed on the outer wall side of said bevel gear for rotation therewith, and a gear rack mounted for axial movement through an opening formed in said lower end wall section of said upper housing, said cable being connected at the upper end thereof to said gear rack for axially moving said cable in response to rotary movement of said gearshift bowl assembly and corresponding rotary movement of said bevel and pinion gears by said selector lever to selectively move said transmission shift lever to the desired gear ratio position.

* * * * *